(12) United States Patent
Ajima

(10) Patent No.: US 9,361,065 B2
(45) Date of Patent: Jun. 7, 2016

(54) PROCESSOR AND PROCESSING METHOD

(71) Applicant: FUJITSU LIMITED, Kawasaki-shi, Kanagawa (JP)

(72) Inventor: Yuichiro Ajima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 247 days.

(21) Appl. No.: 14/159,728

(22) Filed: Jan. 21, 2014

(65) Prior Publication Data

US 2014/0289300 A1  Sep. 25, 2014

(30) Foreign Application Priority Data

Mar. 22, 2013  (JP) ................. 2013-060018

(51) Int. Cl.
*G06F 17/16* (2006.01)
*G06F 7/544* (2006.01)

(52) U.S. Cl.
CPC .................... *G06F 7/5443* (2013.01)

(58) Field of Classification Search
None
See application file for complete search history.

(56) References Cited

U.S. PATENT DOCUMENTS

| | | | | |
|---|---|---|---|---|
| 5,021,987 A * | 6/1991 | Chan | ...... | G06F 17/16 708/607 |
| 6,427,159 B1 * | 7/2002 | Giaume | ...... | G06F 7/53 708/490 |
| 6,526,430 B1 * | 2/2003 | Hung | ...... | G06F 7/544 375/E7.026 |
| 8,959,136 B1 * | 2/2015 | Cheung | ...... | G06F 17/16 708/607 |
| 8,984,043 B2 * | 3/2015 | Ginzburg | ...... | G06F 9/3001 708/607 |
| 2005/0240646 A1 * | 10/2005 | Lin | ...... | G06F 17/16 708/607 |
| 2009/0024685 A1 * | 1/2009 | Salama | ...... | G06F 17/16 708/607 |
| 2009/0083524 A1 | 3/2009 | Van Wel | | |
| 2014/0032625 A1 * | 1/2014 | McCarthy | ...... | G06F 17/16 708/607 |
| 2014/0289300 A1 * | 9/2014 | Ajima | ...... | G06F 7/5443 708/523 |

FOREIGN PATENT DOCUMENTS

| | | |
|---|---|---|
| JP | 10-312374 | 11/1998 |
| JP | 2008-519349 | 6/2008 |

* cited by examiner

*Primary Examiner* — David H Malzahn
(74) *Attorney, Agent, or Firm* — Fujitsu Patent Center

(57) ABSTRACT

In a processor that includes a plurality of multipliers and a plurality of adders to execute matrix product processing, each data of input vector data involved in the arithmetic processing is used in two multipliers, whereby arithmetic processing of elements in different rows and different columns in a matrix product operation is executed with a single instruction, that enables the sharing of input data to reduce the number of times data are moved in the whole matrix product processing and reduce power consumption.

6 Claims, 10 Drawing Sheets

F I G. 2
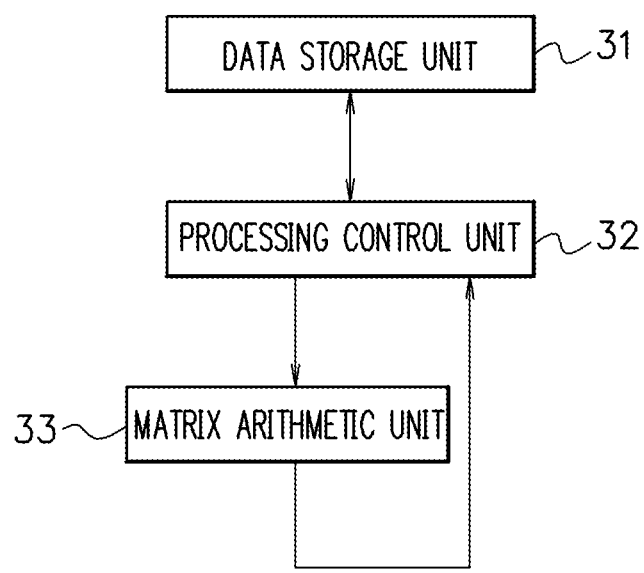

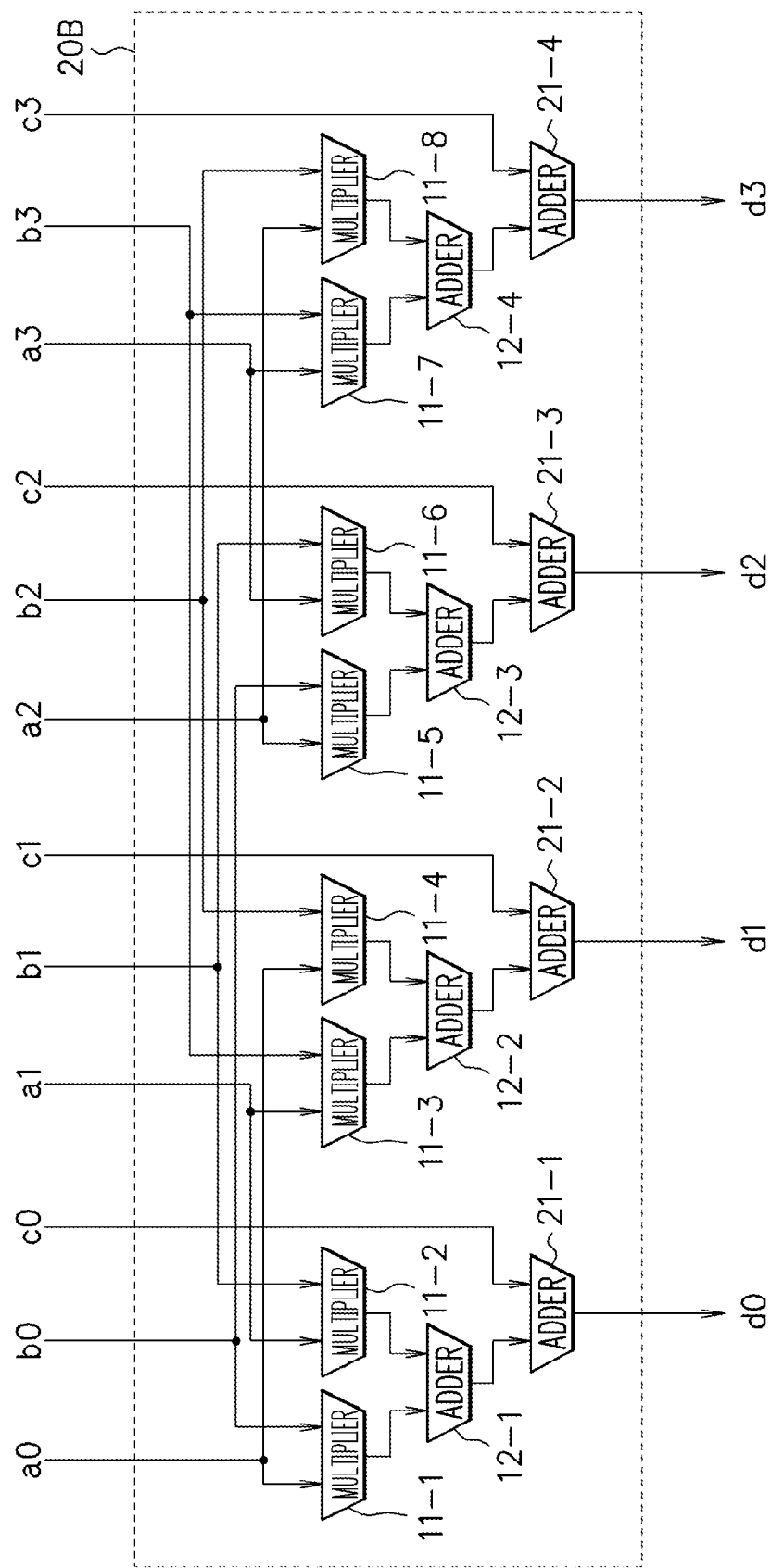
F I G. 7

PROCESSOR AND PROCESSING METHOD

CROSS-REFERENCE TO RELATED APPLICATION

This application is based upon and claims the benefit of priority of the prior Japanese Patent Application No. 2013-060018, filed on Mar. 22, 2013, the entire contents of which are incorporated herein by reference.

FIELD

The embodiments discussed herein are directed to a processor and a processing method.

BACKGROUND

Owing to the progress of process technology, many transistors have come to be integrated on a silicon chip. On the other hand, processing precision of 32 bits or 64 bits is often sufficient in arithmetic processing. Accordingly, as a processing method effectively using the many transistors, widely used is a SIMD (Single Instruction Multiple Data) method that processes a plurality of pieces of data by driving many arithmetic units in parallel with a single instruction (for example, refer to Patent Document 1).

In the SIMD method, for example, a plurality of pieces of 32-bit or 64-bit data are stored in a 128-bit or 256-bit vector register. Four arithmetic operations of the vector data are executed in such a manner that a plurality of arithmetic units for the four arithmetic operations are arranged in line as illustrated in FIG. 9 as an example, and the arithmetic units perform the four arithmetic operations of pieces of corresponding data. FIG. 9 illustrates, as an example, a processing unit 100 which has four multipliers 101-$i$ ($i$=1, 2, 3, 4) and calculates products of vector data each having four elements. The multiplier 101-$i$ receives data a($i$−1) and data b($i$−1) each being one element of the input vector data a, b and outputs a product of the data a($i$−1) and the data b($i$−1) as data c($i$−1) which becomes one element of output vector data c.

The currently available SIMD method is often used for supplying data to many arithmetic units in one cycle, and is called a short-vector SIMD method because its vector register length is several hundred bits at the maximum which is shorter than a conventional vector register length being several thousand bits. A vector operation is suitable for efficiently processing a matrix operation often used in scientific and technical calculation. Hereinafter, as an example, a description will be given of arithmetic processing in which, regarding two-dimensional N×N (N is an integer equal to 2 or more) matrices A, B, C, a product of the matrix A and the matrix B is added to the matrix C.

FIG. 10 is a flowchart representing an example of processing in which the product of the matrix A and the matrix B is added to the matrix C by scalar processing. When the processing starts, a value of a variable j is initialized to 0 at step S301. Next, at step S302, the value of the variable j is checked, and when the value of the variable j is smaller than N, the processing goes to step S303, and otherwise, the processing is ended. At step S303, a value of a variable i is initialized to 0. Next, at step S304, the value of the variable i is checked, and when the value of the variable i is smaller than N, the processing goes to step S305, and otherwise, 1 is added to the value of the variable j at step S310, and the processing goes to step S302. At step S305, a value of a variable k is initialized to 0. Next, at step S306, the value of the variable k is checked, and when the value of the variable k is smaller than N, the processing goes to step S307, and otherwise, 1 is added to the value of the variable i at step S309, and the processing goes to step S304. At step S307, an arithmetic operation is executed in which a product of data A[j][k] at the (j+1)-th row and the (k+1)-th column of the matrix A and data B[k][i] at the (k+1)-th row and the (i+1)-th column of the matrix B is added to data C[j][i] at the (j+1)-th row and the (i+1)-th column of the matrix C, and the addition result is set as data at the (j+1)-th row and the (i+1)-th column of the matrix C. Subsequently, at step S308, 1 is added to the value of the variable k, and the processing goes to step S306. When the processing is executed by the scalar processing, the calculation of the product and the sum is performed $N^3$ times by triple loop processing of the variables i, j, k as represented in FIG. 10. The number of instructions or the processing represented in FIG. 10 is $N^3$.

FIG. 11 is a flowchart representing an example of processing in which a product of a matrix A and a matrix B is added to a matrix C by vector processing of four elements. Processes at steps S401 to S406 and steps S408 and S409 represented in FIG. 11 correspond to the processes at steps S301 to S306 and steps S308 and S309 represented in FIG. 10. The contents of the processes are the same, and therefore, a description thereof will be omitted. At step S407 to which the processing goes when a value of a variable k is smaller than N at step S406, an arithmetic operation is executed in which a product of data A[j+x] [k] (x=0, 1, 2, 3) at the (j+x+1)-th row and the (k+1)-th column of the matrix A and data B[k][i] at the (k+1)-th row and the (i+1)-th column of the matrix B is added to data C[j+x][i] at the (j+x+1)-th and the (i+1)-th column of the matrix C, and the addition result is set as data at the (j+x+1)-th row and the (i+1)-th column of the matrix C. That is, in the example represented in FIG. 11, the vector product operation and the vector sum operation for the continuous four elements are executed with a single instruction. At step S410 to which the processing goes when a value of a variable i is not smaller than N at step S404, 4 is added to a value of a variable j and the processing goes to step S402. When the processing is executed by the vector processing represented in FIG. 11, the vector product operation and the vector sum operation are executed with the continuous four elements, and therefore, the product and sum operations are executed $N^3$ times by ($N^3$/4) instructions.

There has been proposed a processor which executes processing by supplying data of different elements of the same vector register to a plurality of vector arithmetic units capable of executing the same processing, thereby effectively using the vector arithmetic unit not in use to increase the number of elements processed per cycle, enabling an improvement in processing power (for example, refer to Patent Document 2).

[Patent Document 1] National Publication of Translated Version of International Patent Application No. 2008-519349

[Patent Document 2] Japanese Laid-open Patent Publication No. 10-312374

In a semiconductor integrated circuit, power consumption has become a problem since the number of transistors integrated therein is increasing even though a power supply voltage does not decrease from about 1 V under the current process technology. In particular, data move on a silicon chip consumes large power, and it has become important to reduce the number of inputs and outputs to and from a data storage unit such as a register and to dispose the data storage unit and a processing unit close to each other. The matrix product operation to find the product of the two matrices is one of processing involving many data moves between the data storage unit where the data of the matrices are stored and the processing unit. In an arithmetic operation regarding one element, the matrix product operation does not use the same data, and therefore, the number of times of the data input to the processing unit is not reduced even when, for example, a vector operation is used as the arithmetic operation relating to one element, and it is not possible to reduce power consumption of the processor which executes the matrix product processing.

SUMMARY

According to an aspect of the embodiments, a processor includes: a plurality of multipliers that receive four pieces of input data of a first set and four pieces of input data of a second set; and a plurality of adders that each add the outputs of the plural ones of the multipliers to output a result of the addition as output data. As first output data, a sum of a product of first input data of the first set and first input data of the second set and a product of second input data of the first set and third input data of the second set is output. As second output data, a sum of a product of the second input data of the first set and fourth input data of the second set and a product of the first input data of the first set and second input data of the second set is output. As third output data, a sum of a product of third input data of the first set and the first input data of the second set and a product of fourth input data of the first set and the third input data of the second set is output. As fourth output data, a sum of a product of the fourth input data of the first set and the fourth input data of the second set and a product of the third input data of the first set and the second input data of the second set is output.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating a configuration example of the processor in this embodiment;

FIG. 7 is a diagram illustrating another configuration example of the processor in the fourth embodiment;

DESCRIPTION OF EMBODIMENTS

Hereinafter, embodiments will be described with reference to the drawings.

As described above, the matrix product operation does not use the same data in the arithmetic operation regarding one element. Therefore, even when the arithmetic operation regarding one element is done by the vector operation, the number of times the data are moved between the data storage unit and the processing unit is not reduced. However, in the arithmetic operation of elements in different rows and the same column, data in the same column are used, and in the arithmetic operation of elements in different columns and the same row, data in the same row are used. In this embodiment, arithmetic processing of elements in different rows and different columns in a matrix product operation is executed with a single instruction, thereby enabling sharing of input data to reduce the number of times the data are moved between a data storage unit and a processing unit.

Figure 1:
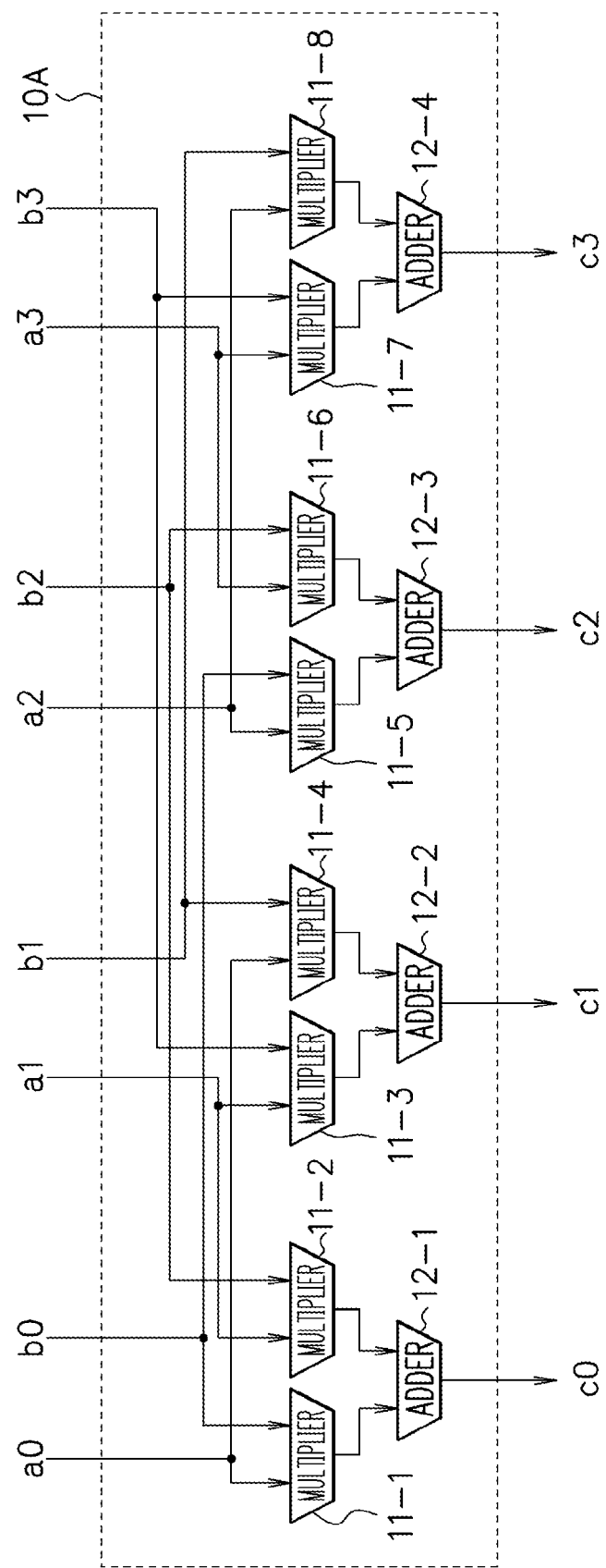
FIG. 1 is a diagram illustrating a configuration example of a processor in a first embodiment.

(First Embodiment) A first embodiment will be described. FIG. 1 is a diagram illustrating a configuration example of a processing unit that a processor in the first embodiment includes. The processing unit 10A is a matrix product arithmetic unit that takes two 2×2 matrices as its input and gives a matrix product of these input matrices as its output. A first input matrix is vector data a having data a0, a1, a2, a3 as its elements. A second input matrix is vector data b having data b0, b1, b2, b3 as its elements. An output matrix is vector data c having data c0, c1, c2, c3 as its elements. The data a0, b0, c0 each are data at the first row and the first column in each of the matrices, the data a1, b1, c1 each are data at the first row and the second column in each of the matrices, the data a2, b2, c2 each are data at the second row and the first column in each of the matrices, and the data a3, b3, c3 each are data at the second row and the second column in each of the matrices. The data a0 to a3, b0 to b3, c0 to c3 are numeric data, and the type of the data is arbitrary. The data type of the data a0 to a3, b0 to b3, c0 to c3 is, for example, a floating-point number type, a fixed-point number type, an integer type, or the like.

The processing unit 10A includes eight multipliers 11-1 to 11-8 and four adders 12-1 to 12-4. The data a0 being the first element of the input vector data a having the four elements is input to a first input of a first multiplier 11-1, and the data b0 being the first element of the input vector data b having the four elements is input to a second input thereof. The first multiplier 11-1 outputs a product of the data a0 and the data b0. The data a1 being the second element of the input vector data a is input to a first input of a second multiplier 11-2 and the data b2 being the third element of the input vector data b is input to a second input thereof. The second multiplier 11-2 outputs a product of the data a1 and data b2. A first adder 12-1 adds the output of the first multiplier 11-1 and the output of the second multiplier 11-2 and outputs the addition result as the data c0 which becomes the first element of the output vector data c having the four elements.

The data a1 of the input vector data a is input to a first input of a third multiplier 11-3, and the data b3 being the fourth element of the input vector data b is input to a second input thereof. The third multiplier 11-3 outputs a product of the data a1 and the data b3. The data a0 of the input vector data a is input to a first input of a fourth multiplier 11-4, and the data b1 being the second element of the input vector data b is input to a second input thereof. The fourth multiplier 11-4 outputs a product of the data a0 and the data b1. A second adder 12-2 adds the output of the third multiplier 11-3 and the output of the fourth multiplier 11-4, and outputs the addition result as the data c1 which becomes the second element of the output vector data c.

The data a2 being the third element of the input vector data a is input to a first input of a fifth multiplier 11-5, and the data b0 of the input vector data b is input to a second input thereof.

The fifth multiplier 11-5 outputs a product of the data a2 and the data b0. The data a3 being the fourth element of the input vector data a is input to a first input of a sixth multiplier 11-6, and the data b2 of the input vector data b is input to a second input thereof. The sixth multiplier 11-6 outputs a product of the data a3 and the data b2. A third adder 12-3 adds the output of the fifth multiplier 11-5 and the output of the sixth multiplier 11-6, and outputs the addition result as the data c2 which becomes the third element of the output vector data c.

The data a3 of the input vector data a is input to a first input of a seventh multiplier 11-7, and the data b3 of the input vector data b is input to a second input thereof. The seventh multiplier 11-7 outputs a product of the data a3 and the data b3. The data a2 of the input vector data a is input to a first input of an eighth multiplier 11-8, and the data b1 of the input vector data b is input to a second input thereof. The eighth multiplier 11-8 outputs a product of the data a2 and the data b1. A fourth adder 12-4 adds the output of the seventh multiplier 11-7 and the output of the eighth multiplier 11-8, and outputs the addition result as the data c3 which becomes the fourth element of the output vector data c.

In this manner, the data a0 being the first element of the input vector data a is input to the first multiplier 11-1 and the fourth multiplier 11-4. The data a1 being the second element of the input vector data a is input to the second multiplier 11-2 and the third multiplier 11-3. The data a2 being the third element of the input vector data a is input to the fifth multiplier 11-5 and the eighth multiplier 11-8. The data a3 being the fourth element of the input vector data a is input to the sixth multiplier 11-6 and the seventh multiplier 11-7.

Further, the data b0 being the first element of the input vector data b is input to the first multiplier 11-1 and the fifth multiplier 11-5. The data b1 being the second element of the input vector data b is input to the fourth multiplier 11-4 and the eighth multiplier 11-8. The data b2 being the third element of the input vector data b is input to the second multiplier 11-2 and the sixth multiplier 11-6. The data b3 being the fourth element of the input vector data b is input to the third multiplier 11-3 and the seventh multiplier 11-7.

In this manner, the data a0 to a3, b0 to b3 read from a data storage unit such as a register are each used in the two of the multipliers 11-1 to 11-8 in the execution of arithmetic processing regarding a matrix product operation. Therefore, as compared with the matrix product processing by a conventional method, it is possible to reduce the number of times the data are input to the processing unit 10A to ½, enabling a reduction in power consumption.

FIG. 2 is a diagram illustrating a configuration example of the processor in this embodiment. The processor in this embodiment includes a data storage unit 31, a processing control unit 32, and a matrix arithmetic unit 33. The data storage unit 31 is, for example, a register or a memory and stores data involved in the arithmetic processing and the like. In the data storage unit 31, input data and output data involved in the matrix operation in the matrix arithmetic unit 33 are stored. The processing control unit 32 executes various kinds of controls regarding the arithmetic processing. For example, the processing control unit 32 issues instructions, and controls data exchange. The matrix arithmetic unit 33 includes the processing unit 10A in this embodiment and executes the matrix product processing according to the control by the processing control unit 32. Incidentally, the data storage unit 31 and the matrix arithmetic unit 33 may be configured to be capable of exchanging data directly.

Figure 3:
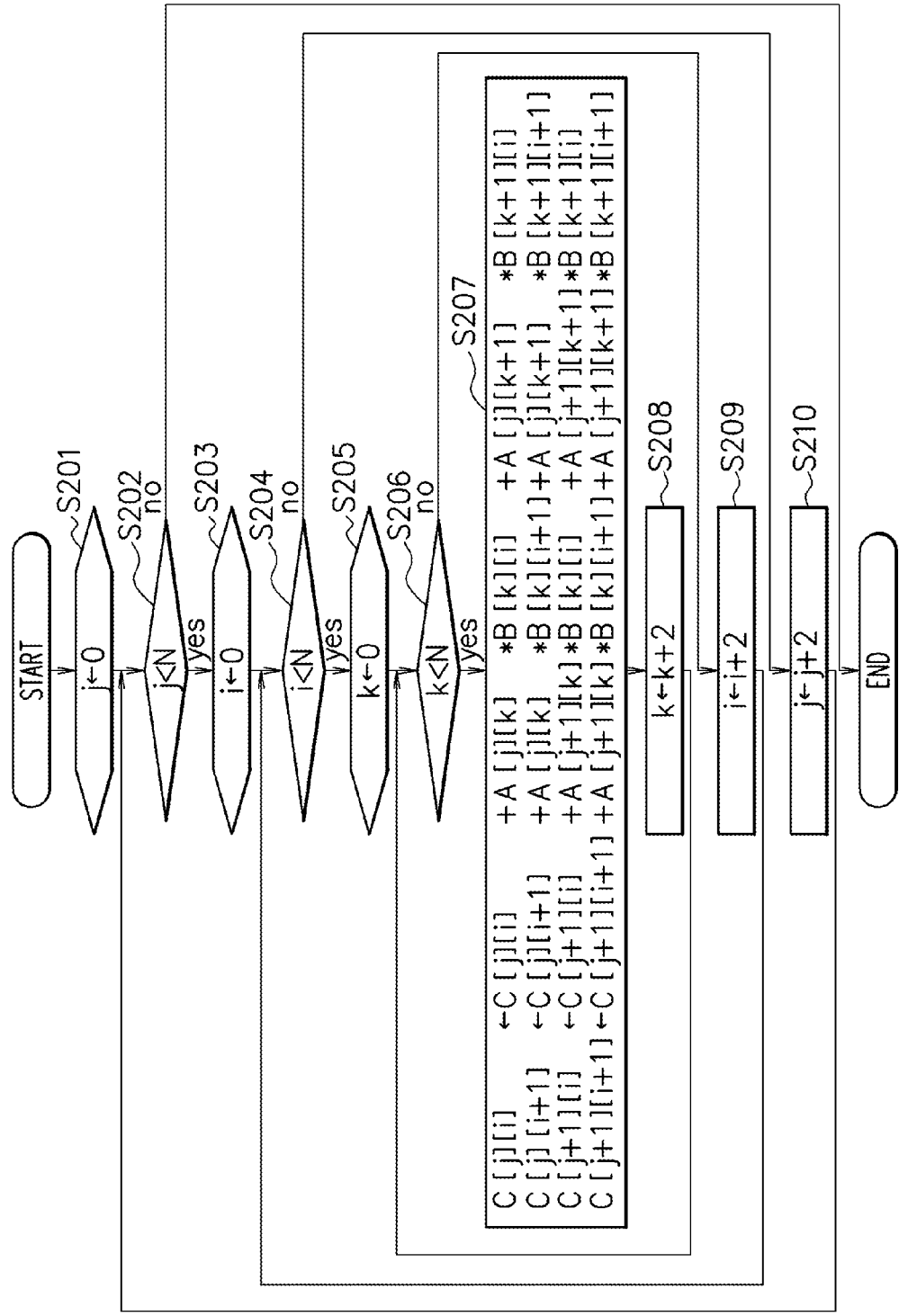
FIG. 3 is a flowchart representing an example of arithmetic processing by the processor in this embodiment.

FIG. 3 is a flowchart representing an example of the matrix product processing of N×N matrices, using the processing unit 10A in the processor in this embodiment. When the processing is started, the processing control unit 32 initializes a value of a variable j to 0 at step S201. Next, at step S202, the processing control unit 32 checks the value of the variable j, and when the value of the variable j is smaller than N, it goes to step S203, and otherwise, ends the processing. At step S203, the processing control unit 32 initializes a value of a variable i to 0. Next, at step S204, the processing control unit 32 checks the value of the variable i, and when the value of the variable i is smaller than N, it goes to step S205, and otherwise, adds 2 to the value of the variable j at step S210 and goes to step S202. At step S205, the processing control unit 32 initializes a value of a variable k to 0. Next, at step S206, the processing control unit 32 checks the value of the variable k, and when the value of the variable k is smaller than N, it goes to step S207, and otherwise, adds 2 to the value of the variable i at step S209 and goes to step S204.

At step S207, the processing control unit 32 reads data A[j][k] at the (j+1)-th row and the (k+1)-th column, data A[j][k+1] at the (j+1)-th row and the (k+2)-th column, data A[j+1][k] at the (j+2)-th row and the (k+1)-th column, and data A[j+1][k+1] at the (j+2)-th row and the (k+2)-th column of the matrix A from the data storage unit 31. The processing control unit 32 reads data B[k][i] at the (k+1)-th row and the (i+1)-th column, data B[k][i+1] at the (k+1)-th row and the (i+2)-th column, data B[k+1][i] at the (k+2)-th row and the (i+1)-th column, and data B[k+1][i+1] at the (k+2)-th row and the (i+2)-th column of the matrix B from the data storage unit 31. Then, the processing control unit 32 supplies the read data A[j][k], A[j][k+1], A[j+1][k], A[j+1][k+1] as the data a0, a1, a2, a3, and the read data B[k][i], B[k][i+1], B[k+1][i], B[k+1][i+1] as the data b0, b1, b2, b3 to the processing unit 10A of the matrix arithmetic unit 33.

The processing unit 10A of the matrix arithmetic unit 33 outputs, as the data c0, (A[j][k]×B[k][i]+A[j][k+1]×B[k+1][i]) which is the sum of a product of the data a0, b0 and a product of the data a1, b2. The processing unit 10A outputs, as the data c1, (A[j][k+1]×B[k+1][i+1]+A[j][k]×B[k][i+1]) which is the sum of a product of the data a1, b3 and a product of the data a0, b1. The processing unit 10A outputs, as the data c2, (A[j+1][k]×B[k][i]+A[j+1][k+1]×B[k+1][i]) which is the sum of a product of the data a2, b0 and a product of the data a3, b2. The processing unit 10A outputs, as the data c3, (A[j+1][k+1]×B[k+1][i+1]+A[j+1][k]×B[k][i+1]) which is the sum of a product of the data a3, b3 and a product of the data a2, b1.

Further, the matrix arithmetic unit 33 adds the data c0 to the data C[j][i] at the (j+1)-th row and the (i+1)-th column of the matrix C to set the result as data at the (j+1)-th row and the (i+1)-th column of the matrix C. The matrix arithmetic unit 33 adds the data c1 to the data C[j][i+1] at the (j+1)-th row and the (i+2)-th column of the matrix C to set the result as data at the (j+1)-th row and the (i+2)-th column of the matrix C. The matrix arithmetic unit 33 adds the data c2 to the data C[j+1][i] at the (j+2)-th row and the (i+1)-th column of the matrix C to set the result as data at the (j+2)-th row and the (i+1)-th column of the matrix C. The matrix arithmetic unit 33 adds the data c3 to the data C[j+1][i+1] at the (j+2)-th row and the (i+2)-th column of the matrix C to set the result as data at the (j+2)-th row and the (i+2)-th column of the matrix C.

Subsequently, at step S208, the processing control unit 32 adds 2 to the value of the variable k and goes to step S206. In this manner, the matrix product processing of the N×N matrices is executed by dividing the N×N input matrices being the arithmetic processing targets into 2×2 partial matrices. In the matrix product processing, the arithmetic processing is executed by sequentially supplying the data of the plural 2×2 partial matrices in the first N×N input matrix which are in the (j+1)-th row and the (j+2)-th row of the arithmetic target, and also sequentially supplying the data of the plural 2×2 partial matrices in the second N×N input matrix which are in the (i+1)-th column and the (i+2)-th column of the arithmetic target.

As described above, according to this embodiment, as illustrated in FIG. 3, the number of times of the loop processing is (N/2) times for all the variables i, j, k, and the number of times the process at step S207 is executed is ($N^3/8$). Since eight pieces of data are used per the process at step S207, the number of times the input data are moved in the whole matrix product processing of the N×N matrices is $N^3$ times. On the other hand, in the conventional method, the number of times the input data are moved in the whole matrix product processing of the N×N matrices is $2N^3$ times. Therefore, it is possible to reduce the number of times the data are moved between the data storage unit 31 and the processing unit 10A to (½), which can reduce power consumption. Further, the number of instructions for executing the matrix product processing of the N×N matrices is (⅛) as compared with the case where it is executed by the scalar processing, which can also shorten the processing time.

(Second Embodiment) Next, a second embodiment will be described. In the second to fourth embodiments described below, since the whole configuration of a processor and matrix product processing of N×N matrices by the processor are the same as those of the first embodiment, a description thereof will be omitted, and the configuration of a processing unit that the processor includes will be described.

Figure 4:
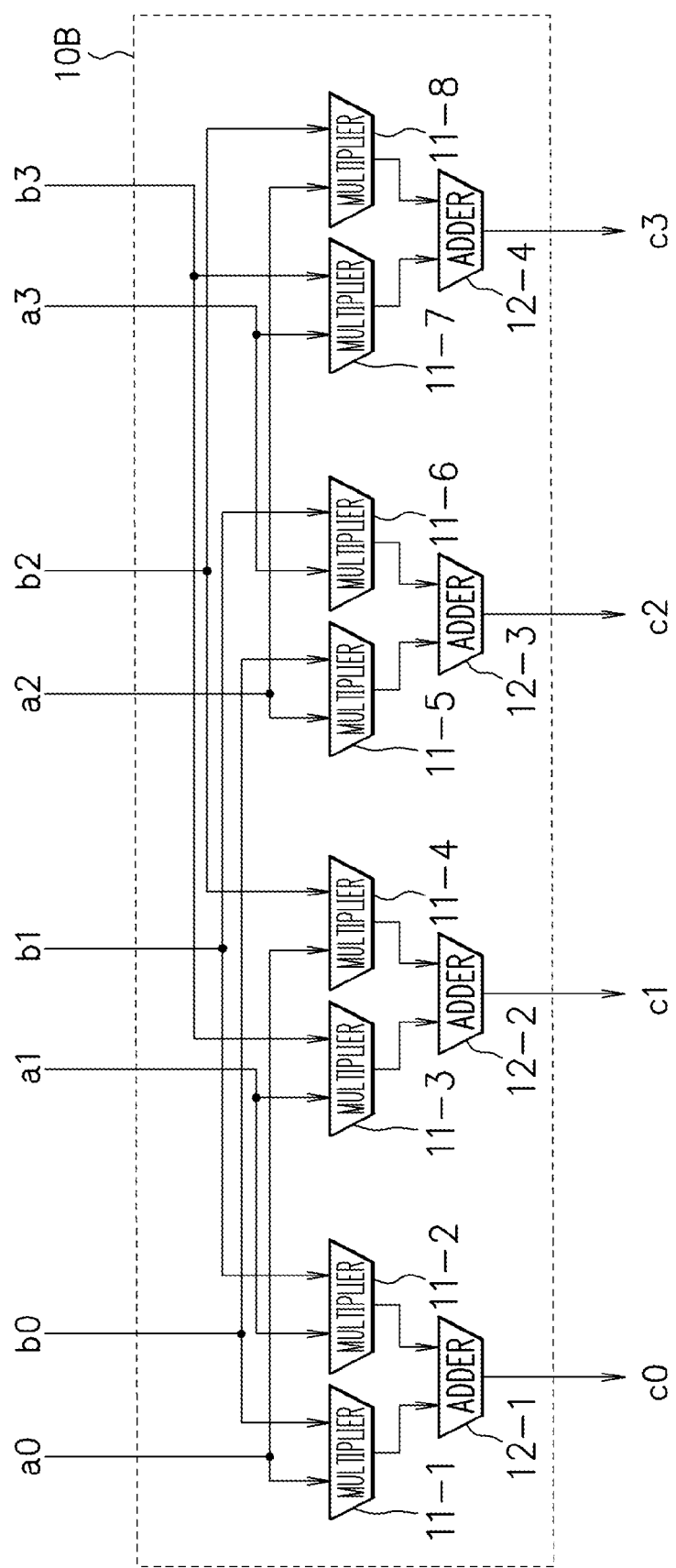
FIG. 4 is a diagram illustrating a configuration example of a processor in a second embodiment.

FIG. 4 is a diagram illustrating a configuration example of the processing unit that the processor in the second embodiment includes. In FIG. 4, constituent elements having the same functions as those of the constituent elements illustrated in FIG. 1 are denoted by the same reference numerals and symbols, and a redundant description thereof will be omitted. The processing unit 10B is a matrix product arithmetic unit which takes two 2×2 matrices as its inputs and gives a matrix product of a first input matrix and a transposed second input matrix as its output. The processing unit 10B is different from the processing unit 10A illustrated in FIG. 1 in that data b1 of input vector data b is input to second inputs of multipliers 11-2, 11-6, and data b2 of the input vector data b is input to second inputs of multipliers 11-4, 11-8.

Processing of a matrix product is multiplication of data in a row direction of one of the matrices and data in a column direction of the other matrix. For example, if the data of the both matrices are stored in a data storage unit in the same manner so that the data are continuously stored on per row basis from the top to the end in the row direction and at the end in the row direction, the row for data storage is shifted to the next row, data read as the input vector data b are stored not in continuous areas but in discontinuous areas. Therefore, an overhead becomes large in data reading from the data storage unit. On the other hand, according to the second embodiment, the data b0, b1, b2, b3 of the vector data b as the second input matrix are interchanged similarly to the transposition of the matrix, and therefore, even when the data of the both matrices are stored in the same manner, it is possible to reduce the overhead in the data reading from the data storage unit.

Figure 5:
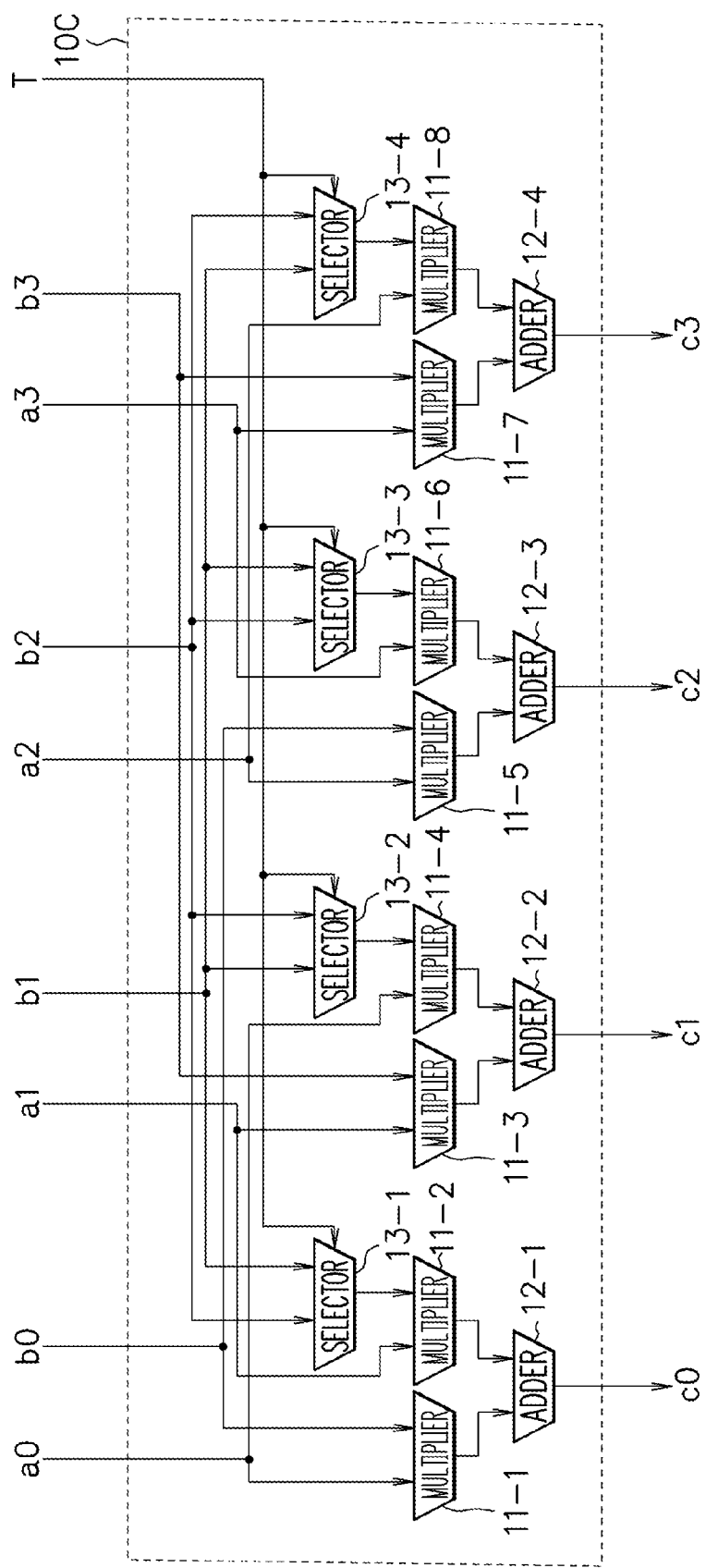
FIG. 5 is a diagram illustrating a configuration example of a processor in a third embodiment.

(Third Embodiment) Next, a third embodiment will be described. FIG. 5 is a diagram illustrating a configuration example of a processing unit that a processor in the third embodiment includes. In FIG. 5, constituent elements having the same functions as those of the constituent elements illustrated in FIG. 1 are denoted by the same reference numerals and symbols, and a redundant description thereof will be omitted. The processing unit 10C is a matrix product arithmetic unit that takes two 2×2 matrices and a control signal (change signal) T as its inputs, selects whether or not to transpose the second input matrix according to the control signal T, and outputs a matrix product of the two input matrices.

The processing unit 10C includes four selectors 13-1 to 13-4 in addition to the eight multipliers 11-1 to 11-8 and the four adders 12-1 to 12-4. Data b1, b2 of input vector data b and the control signal T are input to the selectors 13-1 to 13-4. A first selector 13-1 and a third selector 13-3 output the data b2 when the control signal T is off (for example, 0), and output the data b1 when the control signal T is on (for example, 1). A second selector 13-2 and a fourth selector 13-4 output the data b1 when the control signal T is off (for example, 0), and output data b0 when the control signal T is on (for example, 1).

The output of the first selector 13-1 is input to a second input of the second multiplier 11-2. The output of the second selector 13-2 is input to a second input of the fourth multiplier 11-4. The output of the third selector 13-3 is input to a second input of the sixth multiplier 11-6. The output of the fourth selector 13-4 is input to a second input of the eighth multiplier 11-8.

The above-described configuration makes it possible to execute matrix product processing by appropriately selecting whether or not to transpose the second input matrix, according to a storage method of vector data of input matrices in a data storage unit.

Figure 6:
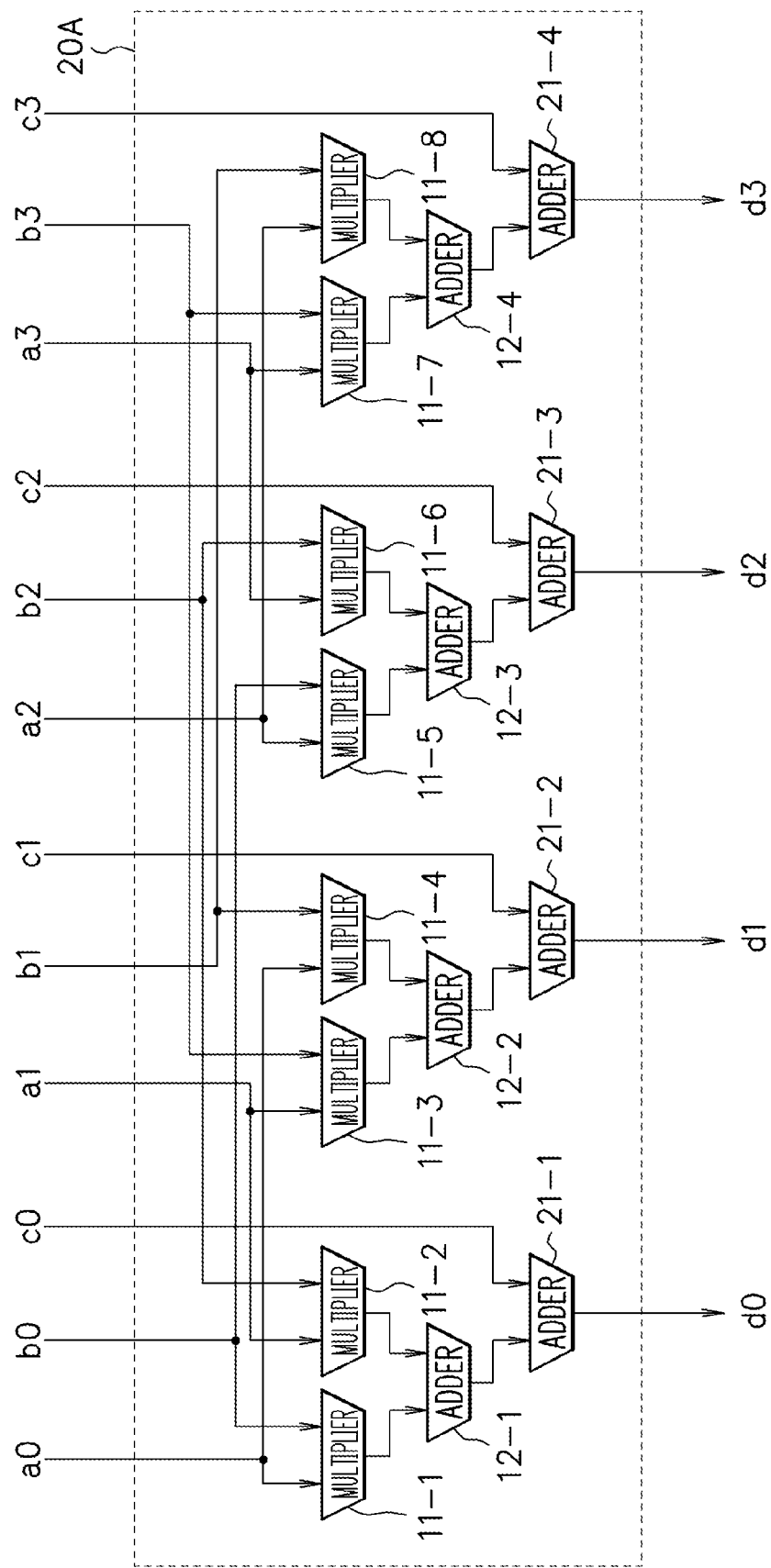
FIG. 6 is a diagram illustrating a configuration example of a processor in a fourth embodiment.

(Fourth Embodiment) Next, a fourth embodiment will be described. FIG. 6 is a diagram illustrating a configuration example of a processing unit that a processor in the fourth embodiment includes. In FIG. 6, constituent elements having the same functions as those of the constituent elements illustrated in FIG. 1 are denoted by the same reference numerals and symbols, and a redundant description thereof will be omitted. The processing unit in the fourth embodiment is a matrix product arithmetic unit that takes three 2×2 matrices as its inputs, and gives the sum of a matrix product of two input matrices (a first input matrix and a second input matrix) and one input matrix (a third input matrix) as its output.

The first input matrix is vector data a having data a0, a1, a2, a3 as its elements. The second input matrix is vector data b having data b0, b1, b2, b3 as its elements. The third input matrix is vector data c having data c0, c1, c2, c3 as its elements. An output matrix is vector data d having data d0, d1, d2, d3 as its elements. The data a0, b0, c0, d0 are each data at the first row and the first column in each of the matrices, the data a1, b1, c1, d1 are each data at the first row and the second column in each of the matrices, the data a2, b2, c2, d2 are each data at the second row and the first column in each of the matrices, and the data a3, b3, c3, d2 are each data at the second row and the second column in each of the matrices. The data a0 to a3, b0 to b3, c0 to c3, d0 to d3 are numeric data, and the type of the data is arbitrary. The data type of the data a0 to a3, b0 to b3, c0 to c3, d0 to d3 is, for example, a floating-point number type, a fixed-point number type, an integer type, or the like.

The processing unit 20A is different from the processing unit 10A illustrated in FIG. 1 in that it includes four adders 21-1 to 21-4 in addition to the eight multipliers 11-1 to 11-8 and the four adders 12-1 to 12-4. A fifth adder 21-1 adds an output of the first adder 12-1 and the data c0 being the first element of the input vector data c, and outputs the addition result as the data d0 which becomes the first element of the output vector data d. A sixth adder 21-2 adds an output of the second adder 12-2 and the data c1 being the second element of the input vector data c, and outputs the addition result as the data d1 which becomes the second element of the output vector data d.

A seventh adder 21-3 adds an output of the third adder 12-3 and the data c2 being the third element of the input vector data c, and outputs the addition result as the data d2 which becomes the third element of the output vector data d. An eighth adder 21-4 adds an output of the fourth adder 12-4 and the data c3 being the fourth element of the input vector data c, and outputs the addition result as the data d3 which becomes the fourth element of the output vector data d.

By thus providing the adders 21-1 to 21-4 and inputting the data of matrices A, B, C as the input vector data a, b, c, and setting the output vector data d as the data of the matrix C, it is possible for the processing unit 20A to execute the arithmetic operation represented at step S207 of FIG. 3 with a single instruction.

Figure 8:
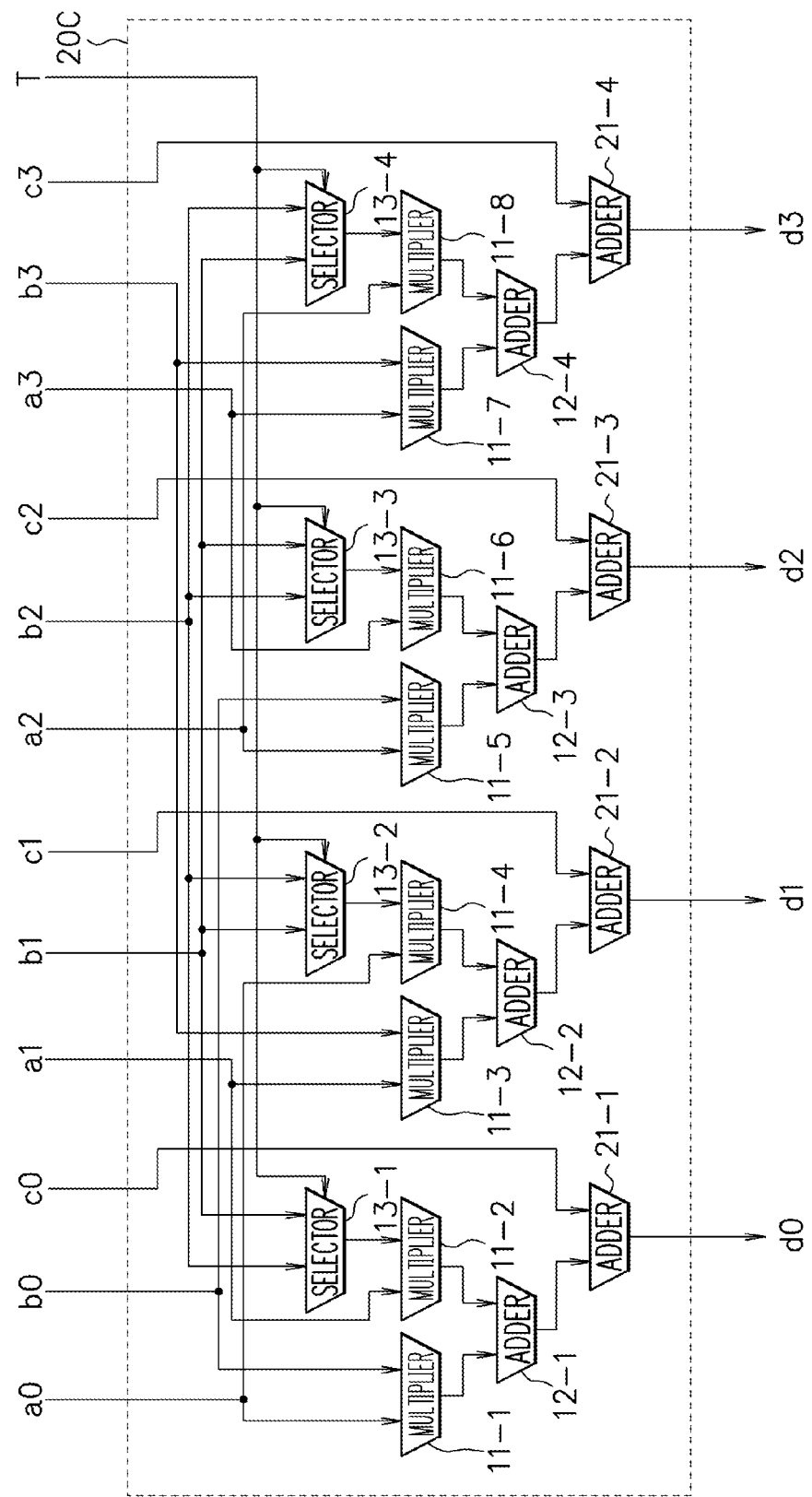
FIG. 8 is a diagram illustrating another configuration example of the processor in the fourth embodiment.
Figure 9:
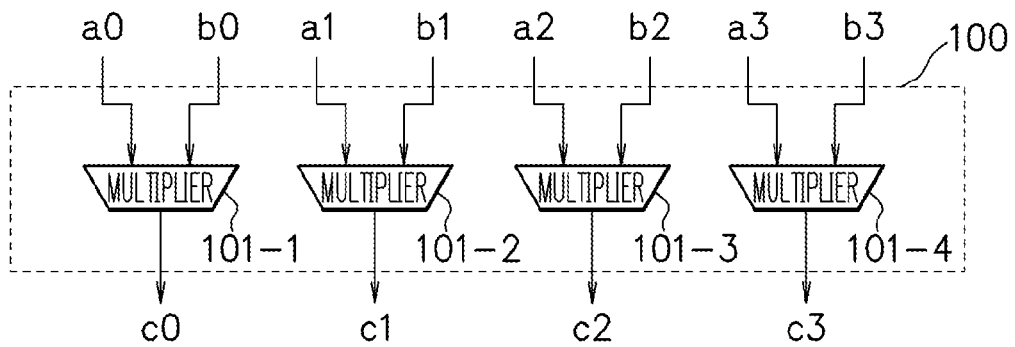
FIG. 9 is a diagram illustrating a configuration example of a conventional processor.
Figure 10:
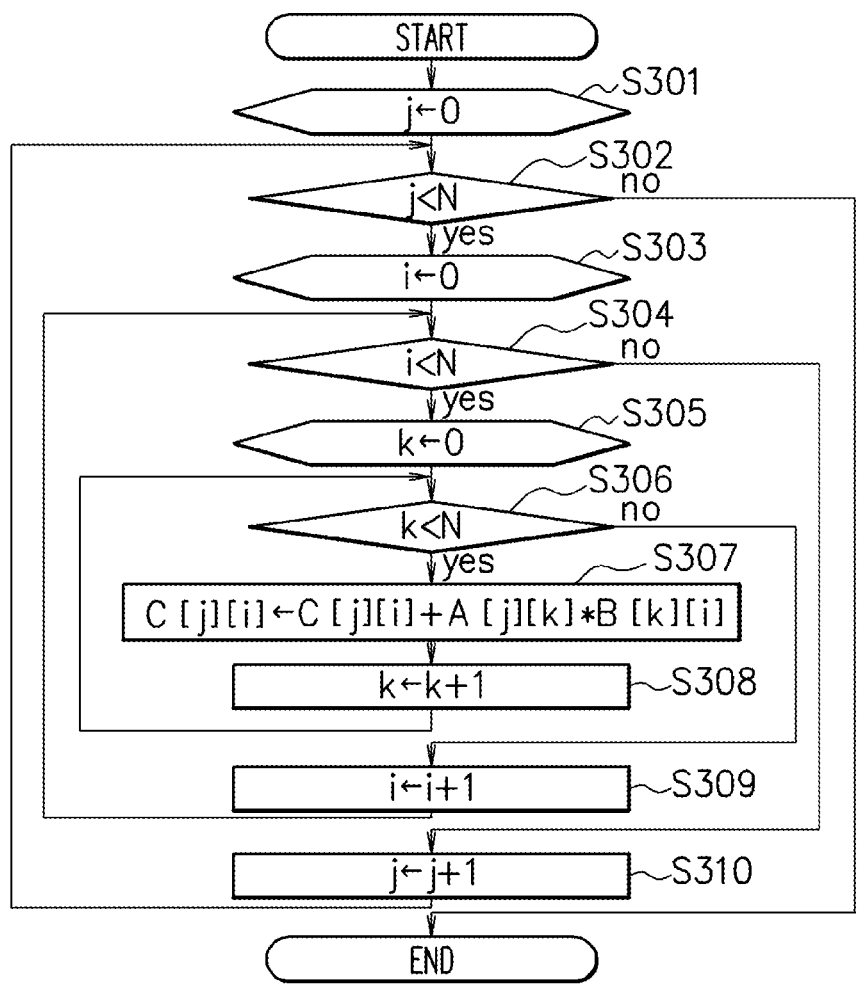
FIG. 10 is a flowchart representing an example of conventional matrix processing (scalar processing)
Figure 11:
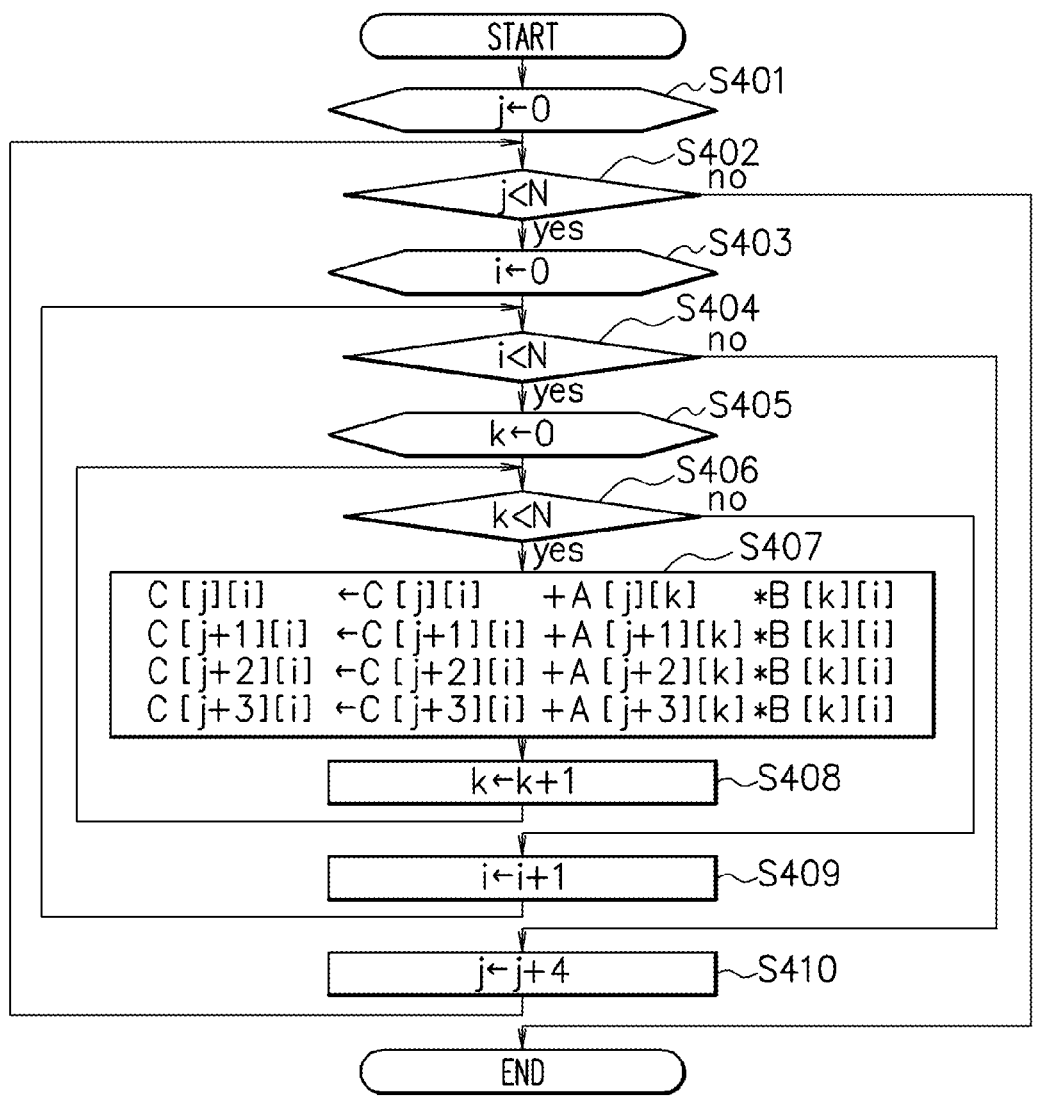
FIG. 11 is a flowchart representing an example of conventional matrix processing (vector processing).

In the above description, the example is described where the four adders 21-1 to 21-4 are provided in the processing unit in the first embodiment illustrated in FIG. 1, but the four adders 21-1 to 21-4 may be provided in the processing units in the second and third embodiments as illustrated in FIG. 7 and FIG. 8.

FIG. 7 is a diagram illustrating another configuration example of the processing unit that the processor in the fourth embodiment includes. In FIG. 7, constituent elements having the same functions as those of the constituent elements illustrated in FIG. 1, FIG. 4, and FIG. 6 are denoted by the same reference numerals and symbols, and a redundant description thereof will be omitted. The processing unit 20B illustrated in FIG. 7 is configured such that the four adders 21-1 to 21-4 are provided in the processing unit in the second embodiment illustrated in FIG. 4.

Further, FIG. 8 is still another configuration example of the processing unit that the processor in the fourth embodiment includes. In FIG. 8, constituent elements having the same functions as those of the constituent elements illustrated in FIG. 1, FIG. 5, and FIG. 6 are denoted by the same reference numerals and symbols, and a redundant description thereof will be omitted. The processing unit 20C illustrated in FIG. 8 is configured such that the four adders 21-1 to 21-4 are provided in the processing unit in the third embodiment illustrated in FIG. 5.

By supplying the data of the two input matrices as the input data of the first set and the input data of the second set, each of the input data is supplied to the two multipliers, which can reduce the number of times of the data moves in the whole matrix product processing to reduce power consumption of the processor.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A processor comprising:
   a processing control unit that reads four pieces of input data of a first set and four pieces of input data of a second set from a data storage unit respectively, and supplies, to a plurality of multipliers in parallel, the four pieces of input data of the first set and the four pieces of input data of the second set read from the data storage unit;
   a first multiplier that receives first input data of the first set at a first input and receives first input data of the second set at a second input, and outputs a product of the both input data;
   a second multiplier that receives second input data of the first set at a first input and receives third input data of the second set at a second input, and outputs a product of the both input data;
   a third multiplier that receives the second input data of the first set at a first input and receives fourth input data of the second set at a second input, and outputs a product of the both input data;
   a fourth multiplier that receives the first input data of the first set at a first input and receives second input data of the second set at a second input, and outputs a product of the both input data;
   a fifth multiplier that receives third input data of the first set at a first input and receives the first input data of the second set at a second input, and outputs a product of the both input data;
   a sixth multiplier that receives fourth input data of the first set at a first input and receives the third input data of the second set at a second input, and outputs a product of the both input data;
   a seventh multiplier that receives the fourth input data of the first set at a first input and receives the fourth input data of the second set at a second input, and outputs a product of the both input data;
   an eighth multiplier that receives the third input data of the first set at a first input and receives the second input data of the second set at a second input, and outputs a product of the both input data;
   a first adder that adds an output of the first multiplier and an output of the second multiplier to output an addition result as first output data;
   a second adder that adds an output of the third multiplier and an output of the fourth multiplier to output an addition result as second output data;
   a third adder that adds an output of the fifth multiplier and an output of the sixth multiplier to output an addition result as third output data; and
   a fourth adder that adds an output of the seventh multiplier and an output of the eighth multiplier to output an addition result as fourth output data.

2. The processor according to claim 1, further comprising:
   a fifth adder that adds first input data out of four pieces of input data of a third set and an output of the first adder to output an addition result as the first output data;
   a sixth adder that adds second input data of the third set and an output of the second adder to output an addition result as the second output data;
   a seventh adder that adds third input data of the third set and an output of the third adder to output an addition result as the third output data; and
   an eighth adder that adds fourth input data of the third set and an output of the fourth adder to output an addition result as the fourth output data.

3. The processor according to claim 1, further comprising a plurality of selectors each of that selects and outputs the second input data or the third input data of the second set according to a control signal, wherein:
   the second multiplier and the sixth multiplier receive an output of an first selector at the second inputs; and
   the fourth multiplier and the eighth multiplier receive, at the second inputs, the output of the second selector that outputs the third input data when the first selector outputs the second input data according to the control signal and that outputs the second input data when the first selector outputs the third input data according to the control signal.

4. The processor according to claim 1, wherein:

the input data of each of plural sets stored in the data storage unit are four pieces of data in 2×2 partial matrices into which an N×N matrix is divided; and the processing control unit sequentially supplies the plurality of multipliers with the four pieces of data in plural 2×2 partial matrices in first N×N matrix, corresponding to a row being an arithmetic operation target in the N×N matrix, as the input data of the first set, and sequentially supplies the plurality of multipliers with the four pieces of data in plural 2×2 partial matrices in second N×N matrix, corresponding to the column being the arithmetic operation target, as the input data of the second set.

5. A processor comprising:

a processing control unit that reads four pieces of input data of a first set and four pieces of input data of a second set from a data storage unit respectively, and supplies, to a plurality of multipliers in parallel, the four pieces of input data of the first set and the four pieces of input data of the second set read from the data storage unit;

a first multiplier that receives first input data of the first set at a first input and receives first input data of the second set at a second input, and outputs a product of the both input data;

a second multiplier that receives second input data of the first set at a first input and receives second input data of the second set at a second input, and outputs a product of the both input data;

a third multiplier that receives the second input data of the first set at a first input and receives fourth input data of the second set at a second input, and outputs a product of the both input data;

a fourth multiplier that receives the first input data of the first set at a first input and receives third input data of the second set at a second input, and outputs a product of the both input data;

a fifth multiplier that receives third input data of the first set at a first input and receives the first input data of the second set at a second input, and outputs a product of the both input data;

a sixth multiplier that receives fourth input data of the first set at a first input and receives the second input data of the second set at a second input, and outputs a product of the both input data;

a seventh multiplier that receives the fourth input data of the first set at a first input and receives the fourth input data of the second set at a second input, and outputs a product of the both input data;

an eighth multiplier that receives the third input data of the first set at a first input and receives the third input data of the second set at a second input, and outputs a product of the both input data;

a first adder that adds an output of the first multiplier and an output of the second multiplier to output an addition result as first output data;

a second adder that adds an output of the third multiplier and an output of the fourth multiplier to output an addition result as second output data;

a third adder that adds an output of the fifth multiplier and an output of the sixth multiplier to output an addition result as third output data; and a fourth adder that adds an output of the seventh multiplier and an output of the eighth multiplier to output an addition result as fourth output data.

6. A processing method by a processor including a plurality of multipliers and a plurality of adders, the processing method comprising:

reading, by a processing control unit of the processor, four pieces of input data of a first set and four pieces of input data of a second set from a data storage unit of the processor respectively;

supplying, by the processing control unit, to the plurality of multipliers in parallel, the four pieces of input data of the first set and the four pieces of input data of the second set read from the data storage unit;

outputting, by a first multiplier of the processor, a product of first input data of the first set and first input data of the second set;

outputting, by a second multiplier of the processor, a product of second input data of the first set and third input data of the second set;

outputting, by a third multiplier of the processor, a product of the second input data of the first set and fourth input data of the second set;

outputting, by a fourth multiplier of the processor, a product of the first input data of the first set and second input data of the second set;

outputting, by a fifth multiplier of the processor, a product of third input data of the first set and the first input data of the second set;

outputting, by a sixth multiplier of the processor, a product of fourth input data of the first set and the third input data of the second set;

outputting, by a seventh multiplier of the processor, a product of the fourth input data of the first set and the fourth input data of the second set;

outputting, by an eighth multiplier of the processor, a product of the third input data of the first set and the second input data of the second set;

outputting, by a first adder of the processor, a sum of an output of the first multiplier and an output of the second multiplier, as first output data;

outputting, by a second adder of the processor, a sum of an output of the third multiplier and an output of the fourth multiplier, as second output data;

outputting, by a third adder of the processor, a sum of an output of the fifth multiplier and an output of the sixth multiplier, as third output data; and outputting, by a fourth adder of the processor, a sum of an output of the seventh multiplier and an output of the eighth multiplier, as fourth output data.

* * * * *